US008925388B2

(12) United States Patent
Hugel

(10) Patent No.: US 8,925,388 B2
(45) Date of Patent: Jan. 6, 2015

(54) PRESSURE SENSOR HAVING A CYLINDRICAL PRESSURE MEASURING CELL

(75) Inventor: Michael Hugel, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 84 days.

(21) Appl. No.: 13/703,039

(22) PCT Filed: May 11, 2011

(86) PCT No.: PCT/EP2011/057591
§ 371 (c)(1),
(2), (4) Date: Dec. 10, 2012

(87) PCT Pub. No.: WO2011/154209
PCT Pub. Date: Dec. 15, 2011

(65) Prior Publication Data
US 2013/0086990 A1 Apr. 11, 2013

(30) Foreign Application Priority Data
Jun. 10, 2010 (DE) .......................... 10 2010 029 955

(51) Int. Cl.
*G01B 7/16* (2006.01)
*G01L 19/14* (2006.01)
*G01L 1/04* (2006.01)
*G01L 9/00* (2006.01)

(52) U.S. Cl.
CPC . *G01L 1/04* (2013.01); *G01L 19/14* (2013.01); *G01L 9/0075* (2013.01)
USPC ............................................. 73/774; 73/756

(58) Field of Classification Search
USPC .................................... 73/700, 774, 715, 756
See application file for complete search history.

(56) References Cited

U.S. PATENT DOCUMENTS

| 5,535,629 | A | 7/1996 | Gerdes | |
|---|---|---|---|---|
| 6,883,383 | B2 * | 4/2005 | Alznauer et al. | 73/756 |
| 7,150,197 | B2 * | 12/2006 | Hegner et al. | 73/724 |
| 7,249,515 | B2 * | 7/2007 | Hegner et al. | 73/708 |
| 7,434,465 | B1 * | 10/2008 | Stewart | 73/504.13 |

FOREIGN PATENT DOCUMENTS

| DE | 101 33 066 A1 | 1/2003 |
|---|---|---|
| EP | 0 594 808 A1 | 5/1994 |
| EP | 1 942 325 A2 | 7/2008 |
| WO | 93/22646 A1 | 11/1993 |
| WO | 2010/046249 A1 | 4/2010 |

OTHER PUBLICATIONS

International Search Report in PCT/EP2011/057591, dated Dec. 10, 2012, English translation.
English translation of IPR on Patenatability, WIPO, Geneva, Dec. 20, 2012.

* cited by examiner

*Primary Examiner* — Max Noori
(74) *Attorney, Agent, or Firm* — Bacon & Thomas, PLLC

(57) ABSTRACT

A pressure measuring transducer includes a pressure measuring cell; a measuring cell housing having an annular axial abutment surface, which surrounds an opening; a sealing ring; and a ring of angular cross section for positioning the pressure measuring cell and the sealing ring in the measuring cell chamber. The ring of angular cross section includes at least a first component of a form-retaining material and at least a second component of an elastic material, wherein the at least one form-retaining component forms the radial shoulder and extends in the axial direction into the annular gap, and the second component is connected with the first component and extends in the annular gap at least sectionally radially between the lateral surface of the pressure measuring cell and the wall of the measuring cell chamber.

14 Claims, 3 Drawing Sheets

PRESSURE SENSOR HAVING A CYLINDRICAL PRESSURE MEASURING CELL

TECHNICAL FIELD

The present invention relates to a pressure measuring transducer having a cylindrical pressure measuring cell.

BACKGROUND DISCUSSION

Pressure measuring transducers of the field of the invention have a ceramic pressure measuring cell in a housing, wherein the pressure measuring cell is arranged in a measuring cell chamber in the housing, wherein the measuring cell chamber has an opening, through which the pressure measuring cell is contactable with a media pressure, wherein the housing has a radially inwardly extending, annular shoulder, which the housing opening surrounds, and which forms, for a sealing ring, an axial abutment surface, on which the sealing ring lies, against which the pressure measuring cell is axially clamped with a tightening apparatus. For positioning the pressure measuring cell and the sealing ring in the housing, rings of angular cross section are applied, which are inserted in an annular gap between the lateral surface of the pressure measuring cell and the housing wall, and which grip around the edge of the opening-side end face of the pressure measuring cell.

A pressure measuring transducer of the field of the invention is disclosed, for example, in the European Patent EP 0 594 808 B1, wherein the there described ring of angular cross section serves especially to enable a modular construction of the housing, in the case of which the axial shoulder is embodied on a process connection element, which has the housing opening, through which the pressure measuring cell is to be supplied with a pressure, wherein the connection element has on its lateral surface a screw thread, which engages in a complementary internal thread in the housing, wherein the internal thread is arranged in a frontal end section of the sensor chamber. The task of the ring of angular cross section in this connection is divided into two parts, namely, on the one hand, the axial and radial positioning of the pressure measuring cell in the housing and, on the other hand, the holding of the O-ring before the mounting of the connection element. Especially, the stress behavior of the pressure measuring cell in the housing assumes, however, a sufficiently elastic material for the ring of angular cross section, which, as regards the radial support of the sealing ring by the ring of angular cross section, requires compromises, since the sealing ring and ring of angular cross section have materials of similar hardness, and, thus, the ring of angular cross section scarcely appears suitable for support of the sealing ring under pressure loading.

In the case of smaller pressure measurement cells, it is, however, necessary that the position of the sealing ring be exactly defined, since the relative importance of a radial shifting of the sealing ring increases with decreasing diameter of the pressure measuring cell.

SUMMARY OF THE INVENTION

It is, therefore, an object of the present invention to provide a pressure measuring transducer, which overcomes the disadvantages of the state of the art, thus, on the one hand, seats the pressure measuring cell stress-freely in the measuring cell chamber and, on the other hand, positions the sealing ring radially defined even in the presence of pressure loading. The object is achieved according to the invention by the pressure measuring transducer as defined in the independent patent claim 1.

The pressure measuring transducer of the invention comprises: an essentially cylindrical, pressure measuring cell; a measuring cell housing having an at least sectionally essentially cylindrical, measuring cell chamber; a sealing ring; a clamping apparatus; and a ring of angular cross section for positioning the pressure measuring cell and the sealing ring in the measuring cell chamber, wherein the measuring cell chamber has an opening, through which the measuring cell chamber is contactable with a media pressure, wherein the measuring cell housing has an annular axial abutment surface, which surrounds the opening and which extends radially inwards from a cylindrical wall of the measuring cell chamber, wherein the sealing ring lies on the axial abutment surface, wherein the pressure measuring cell lies with a frontal end face on the sealing ring, wherein the clamping apparatus lies on a rear end face of the pressure measuring cell, in order to clamp the pressure measuring cell axially against the sealing ring, wherein the ring of angular cross section is arranged in an annular gap between the pressure measuring cell and a wall the measuring cell chamber and has a radially inwardly extending shoulder, which grips around an edge region of the frontal end face of the pressure measuring cell, wherein the radial shoulder defines a radial stop, in order to position the sealing ring between the pressure measuring cell and the axial abutment surface, wherein, according to the invention, the ring of angular cross section includes at least a first component of a form-retaining material and at least a second component of an elastic material, wherein the at least one form-retaining component forms the radial shoulder and extends in the axial direction into the annular gap, wherein the second component is connected with the first component and extends in the annular gap at least sectionally radially between the lateral surface of the pressure measuring cell and the wall of the measuring cell chamber, in order to position the pressure measuring cell relative to the measuring cell chamber.

In a further development of the invention, the component has an essentially cylindrical section, from which at an end section the radial shoulder extends radially inwards, wherein the cylindrical section has one or more perforations, through which the second component extends, in order to connect the second component with the first component.

In an embodiment of this further development of the invention, the perforations comprise bores or axial slots in the cylindrical section.

In a further development of the invention, the second component comprises an elastomer with a hardness of no more than 50 Shore A. The elastomer can comprise especially VMQ or EPDM.

In a further development of the invention, the first component comprises an organic material, especially an elastomer. The polymer of the first component can especially comprise PEEK, PS or PA xx, especially PA 6, PA 66, PA 12, PA MACM12, PA 6-3-T.

The pressure measuring cell can especially be a ceramic pressure measuring cell comprising a platform and a measuring membrane, wherein the measuring membrane is connected along its edge by means of an annular joint pressure-tightly with the platform, wherein the sealing ring lies on the measuring membrane in the region of the measuring membrane aligning with the joint. The sealing ring can especially comprise an elastomer.

The clamping apparatus can, according to a further development of the invention, comprise a screw ring, which has a screw thread on its lateral surface, and wherein the housing has an internal thread complementary to the screw thread of the screw ring, into which the screw ring is screwed, in order to clamp the pressure measuring cell.

In a further development of the invention, at least one decoupling element is arranged between the screw ring and the pressure measuring cell. The decoupling element serves especially to protect the pressure measuring cell from radial stresses due to different coefficients of thermal expansion of the material of the screw ring, on the one hand, and the material of the pressure measuring cell, on the other hand, which radial stresses could otherwise be introduced into the pressure measuring cell via frictional contact.

In a currently preferred embodiment of the invention, the decoupling element comprises the same material as the pressure measuring cell, or as the platform of the pressure measuring cell.

In a further development of the invention, the second component of the ring of angular cross section comprises a plurality of spring elements, which are arranged in the annular gap for positioning the pressure measuring cell.

In a further development of the invention, the cylindrical section of the first component fills no more than 70% preferably no more than 50%, of the volume of the annular gap between the pressure measuring cell and the wall of the measuring cell chamber, wherein the spring elements fill no more than 80%, preferably no more than 60% and especially preferably no more than 50% of the remaining volume of the annular gap. The remaining volume of the annular gap is the difference between the total volume of the annular gap and the volume of the cylindrical section of the first component in the annular gap.

The spring elements comprise, in an embodiment the invention, webs, which extend in the axial direction.

In an embodiment of the invention, the radial stop for the sealing ring has a toroidal bearing area for the sealing ring.

By controlling the sideways position of the pressure measuring cell, the ring of angular cross section furthermore serves to assure a voltage resistance of, for example, 600V between the circuit ground of the pressure measuring cell and the earth ground of the housing. Especially, a metal joint between the measuring membrane and the platform of the pressure measuring cell, which extends up to the lateral surface of the pressure measuring cell, is placed at the circuit ground of the pressure measuring cell. Insofar, it is important to maintain the minimum separations between the lateral surface of the pressure measuring cell and the housing, and this is achieved by the ring of angular cross section.

BRIEF DESCRIPTION OF THE DRAWINGS

The invention will now be explained based on the examples of embodiments shown in the drawing, the figures of which show as follows.

DETAILED DISCUSSION IN CONJUNCTION WITH THE DRAWINGS

Figure 1:
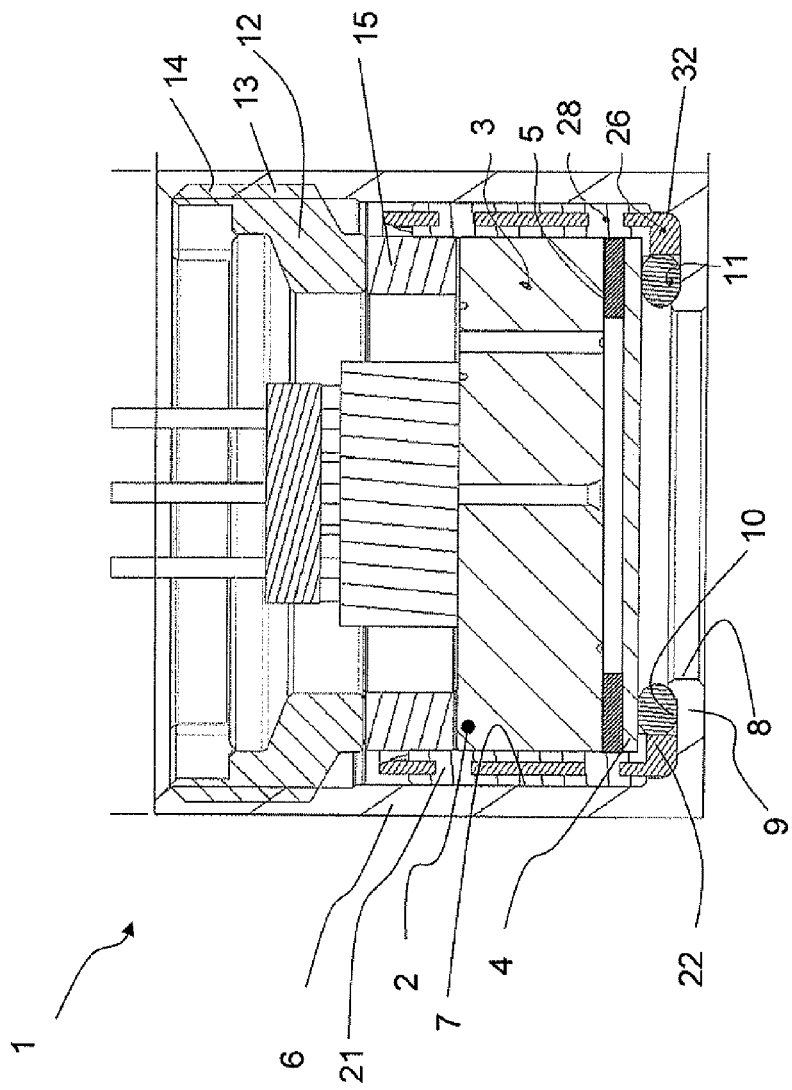
FIG. 1 is a longitudinal section through a section of a pressure measuring transducer of the invention.

The pressure measuring cell is arranged in a housing 6 containing in its interior a cylindrical, measuring cell chamber 7, which is contactable with a pressure through a frontal opening 8, wherein the frontal opening 8 is bordered by a radial shoulder 9, which extends radially inwards from the cylindrical wall of the measuring cell chamber 7. The radial shoulder 9 defines an axial stop 10, on which an elastic sealing ring, especially an O-ring 11, is supported. The pressure measuring cell 2 is axially clamped in the measuring cell chamber between the sealing ring 11 and a tightening ring 12, wherein the tightening ring 12 has on a section of its lateral surface an external thread 13, which engages with a complementary internal thread 14 in the housing 6. Arranged and clamped between the tightening ring 12 and the pressure measuring cell is a decoupling ring 15, wherein the decoupling ring 15 comprises especially the same material as the platform of the basic measuring cell 2. For positioning the pressure measuring cell 2 in the measuring cell chamber 7, a ring of angular cross section 20 is provided, which comprises a cylindrical section 21 and a radial shoulder 22, wherein the radial shoulder 22 extends radially inwards at a front end of the cylindrical section 21. The ring of angular cross section is arranged in an annular gap formed between the pressure measuring cell 2 and the wall of the measuring cell chamber 7, wherein the ring of angular cross section grips with its radial shoulder 22 around the edge region of the measuring membrane 4. The radial shoulder 22 includes a bearing area 24, on which the sealing ring 11 is radially supported. The ring of angular cross section 20 comprises a first component 26, which comprises an elastomer, which is essentially form stable under the arising forces, and a second component 28, which comprises a markedly softer elastomer, wherein the first component forms the basic structure of the ring of angular cross section, to which the second component is secured.

Radial shoulder 22 serves for support of the sealing ring, wherein the radial shoulder extends between the bearing area 24 for the sealing ring 11 and a lateral surface section 32 of the first component, wherein the lateral surface section is positioned with a clearance fit in the housing for adequately defining the position of the sealing ring relative to the housing, wherein the sealing ring is supported radially in this position on the bearing area 24 by the radial shoulder 22 also in the case of pressure loading.

For the tolerance of the diameter d of the ring of angular cross section in the region of the clearance fit, the following relationship holds:

$$d_0-0.05 \text{ mm} \leq d \leq d_0+0.15 \text{ mm},$$

wherein $d_0$ is the desired diameter. The tolerances of the gap are thus half the diameter tolerances.

Figure 2:
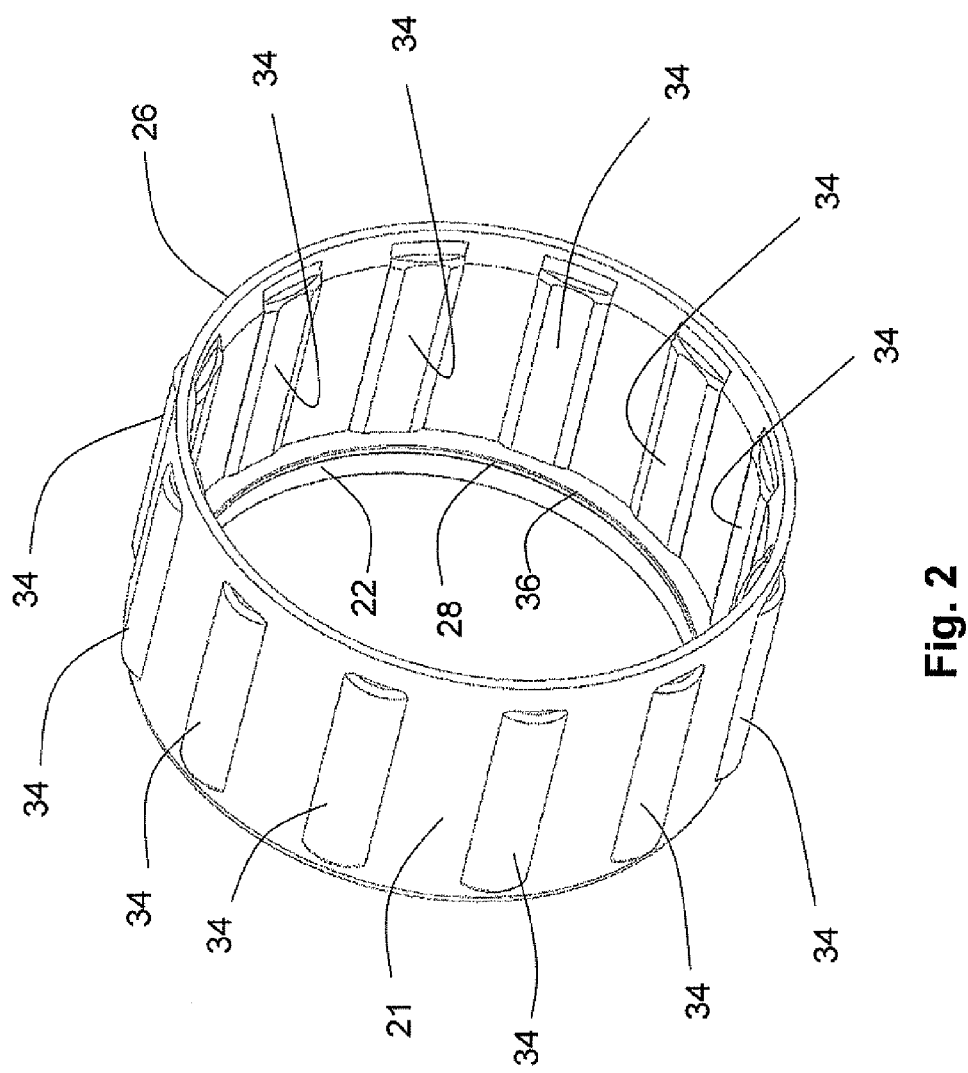
FIG. 2 is an example of an embodiment of a ring of angular cross section for a pressure measuring transducer of the invention.

The example of an embodiment of a ring of angular cross section 20 shown in FIG. 2 includes a cylindrical section 21 and a radial shoulder 22, wherein the ring of angular cross section has a first component 26 of a comparatively hard elastomer and a second component 28 of a comparatively soft elastomer. The first component 26 defines a cylindrical, basic structure and a radial shoulder 22 up to its radial bearing area 24, while the second component 28 comprises axial webs 34, which extend through perforations of the first component 26. The axial webs 34 are connected with one another via a ring 36, which forms a part the radial shoulder 22.

The pressure measuring cell is inserted into this ring of angular cross section, wherein the sideways position of the pressure measuring cell in the measuring cell chamber of the housing is defined by the webs 34, wherein the webs 34, in turn, contact the housing wall of the measuring cell chamber.

Figure 3:
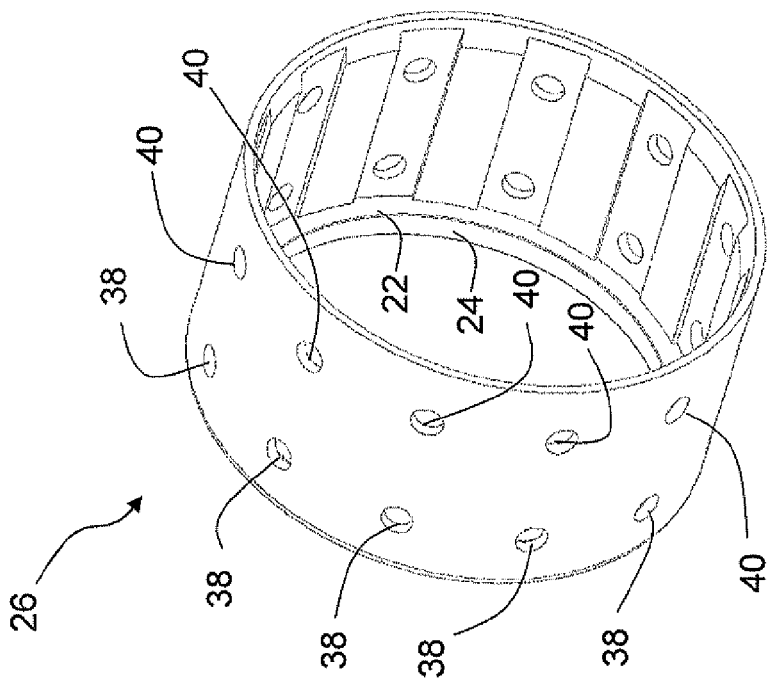
FIG. 3 is the first component of the ring of angular cross section of FIG. 2.

FIG. 3 shows just the first component 26 of the ring of angular cross section containing bores 28 and 40, which form the perforations, through which the webs 34 extend in radial direction, in order to affix these relative to the first component.

Figure 4:
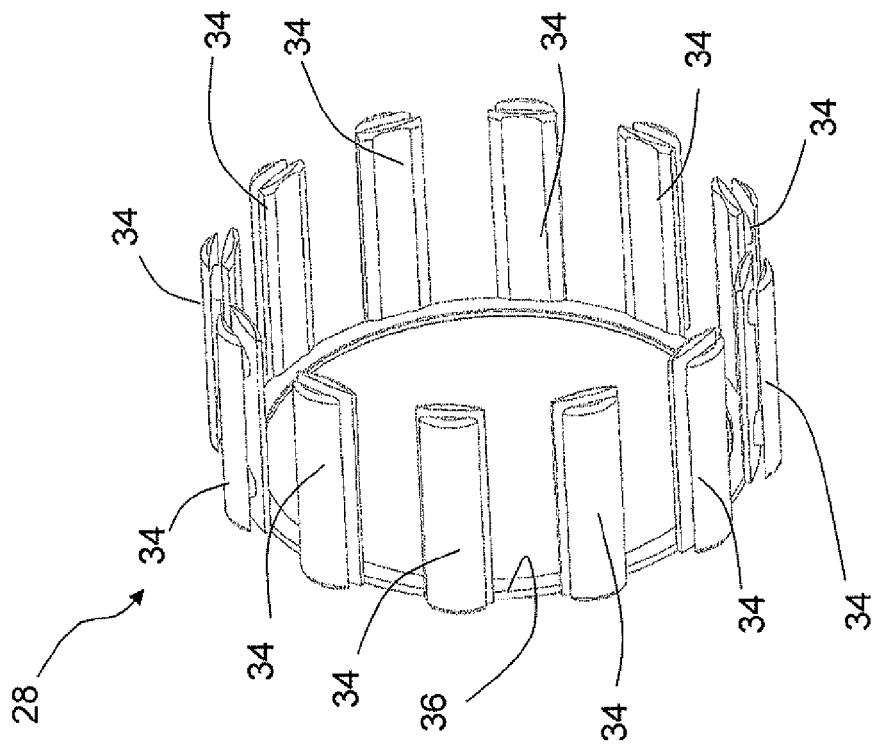
FIG. 4 is the second component of the ring of angular cross section of FIG. 2.

FIG. 4 shows, finally, just the second component of the ring of angular cross section of the invention, wherein the webs 34 are connected with one another via a peripheral ring 36. The ring of angular cross section is produced by injection molding the material of the second component around the first component.

Thus, the present invention provides a pressure measuring transducer with an improved positioning of the sealing ring in the housing, such being critical for maintaining accuracy of measurement in the case of measuring cells of reduced size.

The invention claimed is:

1. A pressure measuring transducer, comprising:
    an essentially cylindrical, pressure measuring cell;
    a measuring cell housing having an essentially cylindrical, measuring cell chamber, wherein said measuring cell chamber has an opening, through which said measuring cell chamber is contactable with a media pressure, and wherein said measuring cell housing has an annular axial abutment surface, which surrounds said opening and which extends radially inwards from a cylindrical wall of said measuring cell chamber;
    a sealing ring;
    a clamping apparatus; and
    a ring of angular cross section for positioning the pressure measuring cell and the sealing ring in the measuring cell chamber, wherein:
    said sealing ring lies on the axial abutment surface,
    said pressure measuring cell lies with its frontal end face on said sealing ring;
    said clamping apparatus lies on the rear end face of said pressure measuring cell, in order to clamp said pressure measuring cell axially against said sealing ring;
    said sealing ring of angular cross section is arranged in an annular gap between said pressure measuring cell and a wall of said measuring cell chamber and has a radially inwardly extending shoulder, which grips around an edge region of the frontal end face of said pressure measuring cell;
    said radial shoulder defines a radial stop, in order to position said sealing ring between said pressure measuring cell and said axial abutment surface;
    said ring of angular cross section includes at least a first component of a form-retaining material and at least a second component of an elastic material; said at least one form-retaining component forms the radial shoulder and extends in the axial direction into the annular gap;
    said second component is connected with said first component and extends in said annular gap at least sectionally radially between the lateral surface of said pressure measuring cell and the wall of said measuring cell chamber, in order to position said pressure measuring cell relative to said measuring cell chamber; and
    said cylindrical section has one or more perforations, through which said second component extends, in order to connect said second component with said first component.

2. The pressure measuring transducer as claimed in claim 1, wherein:
    said first component has an essentially cylindrical section, from which at an end section said radial shoulder extends radially inwards.

3. The pressure measuring transducer as claimed in claim 1, wherein:
    said perforations comprise bores or axial slots in said cylindrical section.

4. The pressure measuring transducer as claimed in claim 1, wherein:
    said second component comprises an elastomer with a hardness of no more than 50 Shore A.

5. The pressure measuring transducer as claimed in claim 1, wherein:
    the elastomer of said second component comprises VMQ or EPDM.

6. The pressure measuring transducer as claimed in claim 1, wherein:
    said first component comprises an organic material, especially an elastomer, preferably PEEK, PS or PAxx.

7. The pressure measuring transducer as claimed in claim 1, wherein:
    said pressure measuring cell is a ceramic pressure measuring cell comprising a platform and a measuring membrane;
    said measuring membrane is connected along its edge by means of an annular joint pressure-tightly with the platform; and
    said sealing ring lies on said measuring membrane in the region of said measuring membrane aligning with the joint.

8. The pressure measuring transducer as claimed in claim 7, wherein:
    said sealing ring comprises an elastomer.

9. The pressure measuring transducer as claimed in claim 8, wherein:
    said clamping apparatus comprises a screw ring, which has a screw thread on its lateral surface; and
    said housing has an internal thread complementary to said screw thread of said screw ring, into which said screw ring is screwed, in order to clamp said pressure measuring cell.

10. The pressure measuring transducer as claimed in claim 9, wherein:
    at least one decoupling element is arranged between said screw ring and said pressure measuring cell.

11. The pressure measuring transducer as claimed in claim 1, wherein:
    said second component of said sealing ring of angular cross section comprises a plurality of spring elements, which are arranged in said annular gap for positioning said pressure measuring cell.

12. The pressure measuring transducer as claimed in claim 11, wherein:
    said cylindrical section of said first component fills no more than 70%, preferably no more than 50% of the volume of said annular gap between said pressure measuring cell and the wall of said measuring cell chamber; and
    said spring elements fill no more than 80%, preferably no more than 60% and especially preferred no more than 50% of the remaining volume of said annular gap.

13. The pressure measuring transducer as claimed in claim 11, wherein:
    said spring elements comprise webs, which extend in the axial direction.

14. The pressure measuring transducer as claimed in claim 1, wherein:
    said radial stop for said sealing ring has a toroidal bearing area for said sealing ring.

* * * * *